United States Patent Office 3,244,167
Patented Apr. 5, 1966

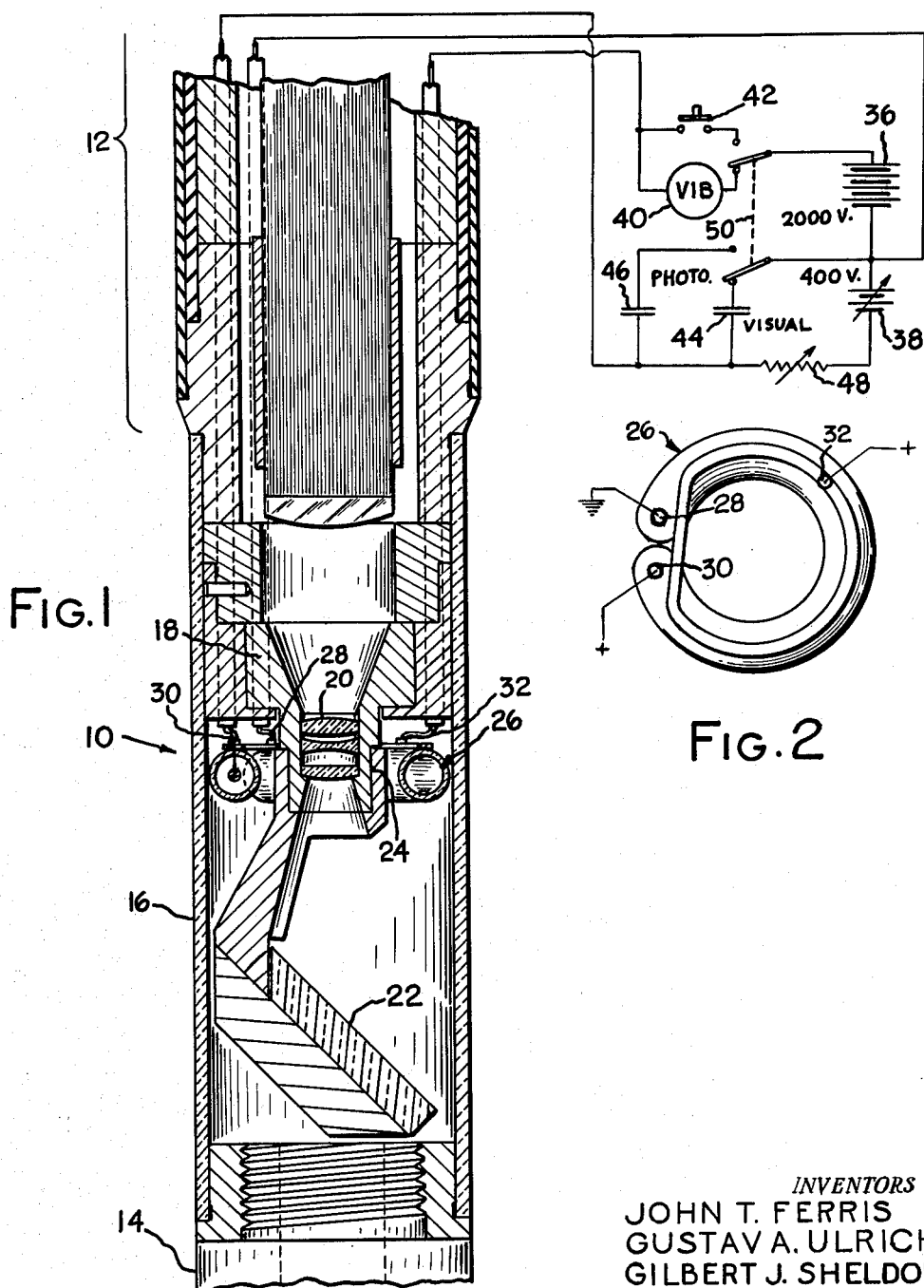

3,244,167
ENDOSCOPE WITH INTERMITTENT ILLUMINATION AND MEANS TO VARY THE INTENSITY AND RATE OF ILLUMINATION FOR VISUAL OR PHOTOGRAPHIC OBSERVATION
John T. Ferris, Pittsford, Gilbert J. Sheldon, Irondequoit, and Gustav A. Ulrich, Rochester, N.Y., assignors to Bausch & Lomb Incorporated, a corporation of New York
Continuation of application Ser. No. 29,417, May 16, 1960. This application June 11, 1963, Ser. No. 288,585
1 Claim. (Cl. 128—6)

This is a continuation of our copending application Serial No. 29,417, filed May 16, 1960, and now abandoned.

The present invention relates to an improved means of energizing a lamp in an endoscope or the like wherein it is desired to provide maximum illumination together with minimum lamp size and minimum heat dissipation.

One important object of the present invention is to provide an improved means of energizing a light source in an endoscope to produce maximum illumination without extending the rated capacity of the light source and without generating excessive heat.

Another object is to provide an improved means of energizing a lamp in an endoscope alternately for visual observation of a selected field and for photographic observation thereof.

These and other objects of the invention will become apparent in the following detailed description of a preferred embodiment thereof, taken in conjunction with the drawing, wherein;

FIG. 1 is a fragmentary, longitudinal sectional view in partly schematic form of the objective portion of an endoscope having a field illumination lamp arrangement for energization according to the invention; and FIG. 2 is a plan view of the lamp used in the endoscope shown in FIG. 1.

It has heretofore been relatively difficult to provide adequate illumination for the field of observation in endoscopic instruments while at the same time shielding the objective lens from a direct view of the illumination source. Various different expedients have been suggested, most of which involve arranging one or more miniature electric lamps in a capsule in front of the objective lens and interposing a light shield between the lamps and the lens. Such arrangements not only require elongation of the instrument beyond the objective lens, but also present problems with respect to concentrating the illumination from the lamps upon the object it is desired to view. In instruments having this arrangement, the light cannot be aimed directly at the object, but must be spread over a relatively wide field when it is desired to view objects spaced at different distances from the endoscope.

According to the present invention, the foregoing difficulties are substantially overcome by arranging a sub-miniature lamp, or group of sub-miniature lamps coaxially around the objective lens, providing thereby a so-called vertical illumination system with the light from the lamps always concentrated toward the field of view in the direction of the viewing axis. The lamp, or lamps are pulse energized to provide relatively high intensity illumination of a discontinuous nature so that the field of view is repetitively illuminated relatively brilliantly, while the average illumination intensity is relatively low and the average level of lamp energization is also relatively low. Since the human eye is responsive primarily to the intermittent peak illumination levels rather than to the average intensity, a satisfactory level of illuminaiton is readily achieved for visual observation. For making photographs of relatively short exposure times, means are provided for energizing the lamp for a relatively long pulse period at relatively high level intensity and for insuring a subsequent relatively long period for recuperation and cooling of the lamp after each such pulse.

Thus, the invention contemplates the pulse energization of the light source, and adjusting the energy content of the pulses and the repetition rate in view of the purpose of the illumination, whether for visual observation or for photographic observation. For visual observation pulses of relatively low energy content are used at a relatively high repetition rate to minimize or eliminate flicker. For making photographs a pulse of relatively high energy content is applied to the lamp, either singly or at a relatively low repetition rate.

As shown, the endoscope includes an objective assembly 10, which is sealed to the front end of a flexible light image transmitting portion 12, and which carries a flexible guide or finger 14 at its forward end. The objective assembly 10 includes a cylindrical window 16, and a rotatable mount 18 supported at the rear of the window 16 upon the front end of the flexible portion 12. The mount 18 carries an objective lens 20 and an inclined mirror 22 in front of the lens 20. A tubular shield 24 is fixed around and extends forwardly from the objective lens 20, and a miniature doughnut shaped lamp 26 is mounted in fixed position around the shield 24. The lamp may be of any desired type capable of pulse energization. The most satisfactory results to date have been achieved using a xenon filled discharge lamp. This type of lamp may be made exceedingly small. In the illustrated embodiment, for example, the overall diameter of the window 16 is about ⅜ inch and the doughnut shaped lamp 26 fits easily within it.

The lamp 26 includes two electrodes 28 and 30 which project into the interior of the lamp, and a third so-called trigger electrode 32, which is disposed exteriorly of the lamp and is in the form of a metal ring cemented upon the outer surface of the lamp.

Light from the lamp 26 is directed partly radially outwardly through the window 16, but a large portion of the light is concentrated in the direction of the viewing axis to provide so-called vertical illumination in the direction of view. This maximizes the concentration of light in the field of view and also provides radially emitted light for filling in shadow detail and improving contrast.

In accordance with the invention, the lamp 26 is pulse energized during visual observation at a sufficiently rapid repetition rate to minimize or eliminate objectionable flicker. Generally, a rate in excess of about fifty to sixty flashes per second is adequate. The individual pulses of energy may be relatively short such as, for example, about ten to fifty microseconds and of sufficient intensity to provide fully adequate illumination without excessive heating or overloading of the lamp 26.

The characteristics of the lamp are such that a certain minimum power is necessary in order to produce luminescence, and if such a power is applied constantly, the lamp overheats or fails. By applying a relatively high energy pulse to the lamp at appropriate intervals, the lamp is intermittently energized at a relatively high level, but the average power input to the lamp is maintained at a relatively low level, thus minimizing the heat dissipation and enhancing the service life of the lamp.

When it is desired to take a photograph of the image transmitted by the endoscope, a relatively high energy pulse, either one of longer duration or one of greater amplitude is applied to the lamp 26, and a relatively prolonged rest period is provided immediately following such energization to permit the lamp to cool and recuperate. The lamp will withstand extremely high energization rates for relatively short periods of time provided adequate cooling and recuperation time is allowed immediately subsequent to such energization.

Energization of the lamp in accordance with the invention may be achieved by any desired circuit means such as, for example, the circuit illustrated in simplified form in FIG. 1. As shown, the circuit includes two direct current energy sources 36 and 38 respectively. The first source 36 is a relatively high voltage source connected between one of the energizing electrodes 28 and 30 and the trigger electrode 32 selectively through either a vibrator 40 or a momentary contact push button 42. The other source 38 is a relatively low voltage source and is connected for selectively charging one or the other of two capacitors 44 and 46 through a variable charging resistor 48.

A manually actuatable, double pole, double throw switch 50 is connected for selecting the mode of operation of the circuit. When the switch is in its lower position, as viewed in the drawing, the trigger voltage is applied to the lamp through the vibrator 40, and the low voltage source 38 is connected for charging the first capacitor 44, which is of relatively small value. When the switch is moved to its alternate, or upper position, the source 38 is connected for charging the second capacitor 46, which is of relatively large value, and the trigger voltage is applied through the momentary contact switch 42.

The first capacitor 44 is charged during the intervals in which the vibrator contacts are open, and delivers a relatively low energy content pulse to the lamp each time the vibrator contacts close, thus providing discontinuous illumination at a relatively high repetition rate for visual observation.

For making a photograph, the switch 50 is reversed to connect the momentary contact switch 42 and the relatively large capacitor 46 in the circuit. The large capacitor 46 delivers a relatively high energy content pulse to the lamp 26 upon closing of the momentary contact switch 42 to provide a relatively intense illumination for exposing the film. For a single, short interval, followed by a relatively long rest period, the lamp 26 may be operated at a power level much higher than the level permissible when it is energized repetitively at relatively short intervals.

Adjustment of the energy levels of the pulses may be made by adjusting the output level of the low voltage source 38 in the case of pulses used for photographic observation, or by adjusting either the source 38 or variable resistor 48, in the case of the visual observation pulses.

What is claimed is:

An illuminating means in an endoscope comprising, an endoscope, an optical system receiving an image of a predetermined field of view in said endoscope, a lamp associated with said optical system in said endoscope illuminating the field of view, a source of direct current energy for energizing said lamp, an R.C. circuit having a short discharge time interval selectively connected to said source of direct current energy, an R.C. circuit having a long discharge time interval selectively connected to said source of direct current energy, a second source of direct current energy for triggering said lamp, a short time interval switching means selectively connected to said second source of direct current energy, a long time interval switching means selectively connected to said second source of direct current energy, means selectively and alternatively connecting said lamp for energization and triggering of said lamp to said sources of direct current energy for short time interval operation, or long time interval operation through said R.C. circuits and said switching means to vary the repetition rate of illumination of said lamp.

References Cited by the Examiner
UNITED STATES PATENTS

| 300,525 | 6/1884 | Starr | 128—6 |
| 2,478,901 | 8/1949 | Edgerton | 315—241 |
| 2,867,209 | 1/1959 | Foures et al. | 128—6 |
| 2,936,753 | 5/1960 | Storz | 128—6 |

OTHER REFERENCES

German printed application 1,025,562, March 1958, (Wolf) 128–4.

RICHARD A. GAUDET, *Primary Examiner.*

ROBERT E. MORGAN, *Examiner.*

R. L. FRINKS, *Assistant Examiner.*